United States Patent
Chen

(10) Patent No.: US 7,481,644 B2
(45) Date of Patent: Jan. 27, 2009

(54) UNIVERSAL MOUNTING BRACKETS FOR ATTACHING A HOT INJECTION MANIFOLD TO THE LOWER DIE SET OF AN INJECTION BLOW MOLDING MACHINE

(75) Inventor: Jincheng Chen, Leawood, KS (US)

(73) Assignee: R & D Tool & Engineering Co., Lee's Summit, MO (US)

( * ) Notice: Subject to any disclaimer, the term of this patent is extended or adjusted under 35 U.S.C. 154(b) by 27 days.

(21) Appl. No.: 11/685,625

(22) Filed: Mar. 13, 2007

(65) Prior Publication Data
US 2007/0218158 A1 Sep. 20, 2007

Related U.S. Application Data

(60) Provisional application No. 60/782,187, filed on Mar. 14, 2006.

(51) Int. Cl.
*B29C 45/22* (2006.01)

(52) U.S. Cl. .............. 425/192 R; 425/572; 248/220.21; 248/346.03

(58) Field of Classification Search .................. 425/190, 425/192 R, 567, 572, 588; 248/188.8, 220.21, 248/220.22, 346.01, 346.03
See application file for complete search history.

(56) References Cited

U.S. PATENT DOCUMENTS

| 4,276,014 | A | * | 6/1981 | Aoki | 425/570 |
|---|---|---|---|---|---|
| 4,395,222 | A | * | 7/1983 | Gaiser et al. | 425/572 |
| 5,232,710 | A | * | 8/1993 | Miyazawa et al. | 425/572 |
| 5,269,677 | A | * | 12/1993 | Gauler | 425/572 |
| 5,429,493 | A | * | 7/1995 | Gauler | 425/572 |
| 6,095,790 | A | * | 8/2000 | Gellert et al. | 425/572 |
| 6,902,119 | B2 | | 6/2005 | Chen et al. | |
| 7,121,819 | B2 | | 10/2006 | Chen et al. | |
| 2004/0001901 | A1 | * | 1/2004 | Towery et al. | 425/190 |
| 2004/0140370 | A1 | * | 7/2004 | Chen et al. | 239/128 |
| 2006/0278781 | A1 | * | 12/2006 | Homra et al. | 248/220.21 |

* cited by examiner

*Primary Examiner*—Robert B Davis
(74) *Attorney, Agent, or Firm*—Hovey Williams LLP

(57) ABSTRACT

Tooling for the injection station of an injection blow molding machine includes a set of individual mounting bracket assemblies that attach an elongated manifold block to the lower die set of the machine. The relatively slender brackets are designed to have minimal thermal contact with the manifold block without sacrificing stability and structural integrity. Standard sizes of the brackets maybe manufactured in advance to accommodate manifold blocks of different lengths but standard widths.

28 Claims, 3 Drawing Sheets

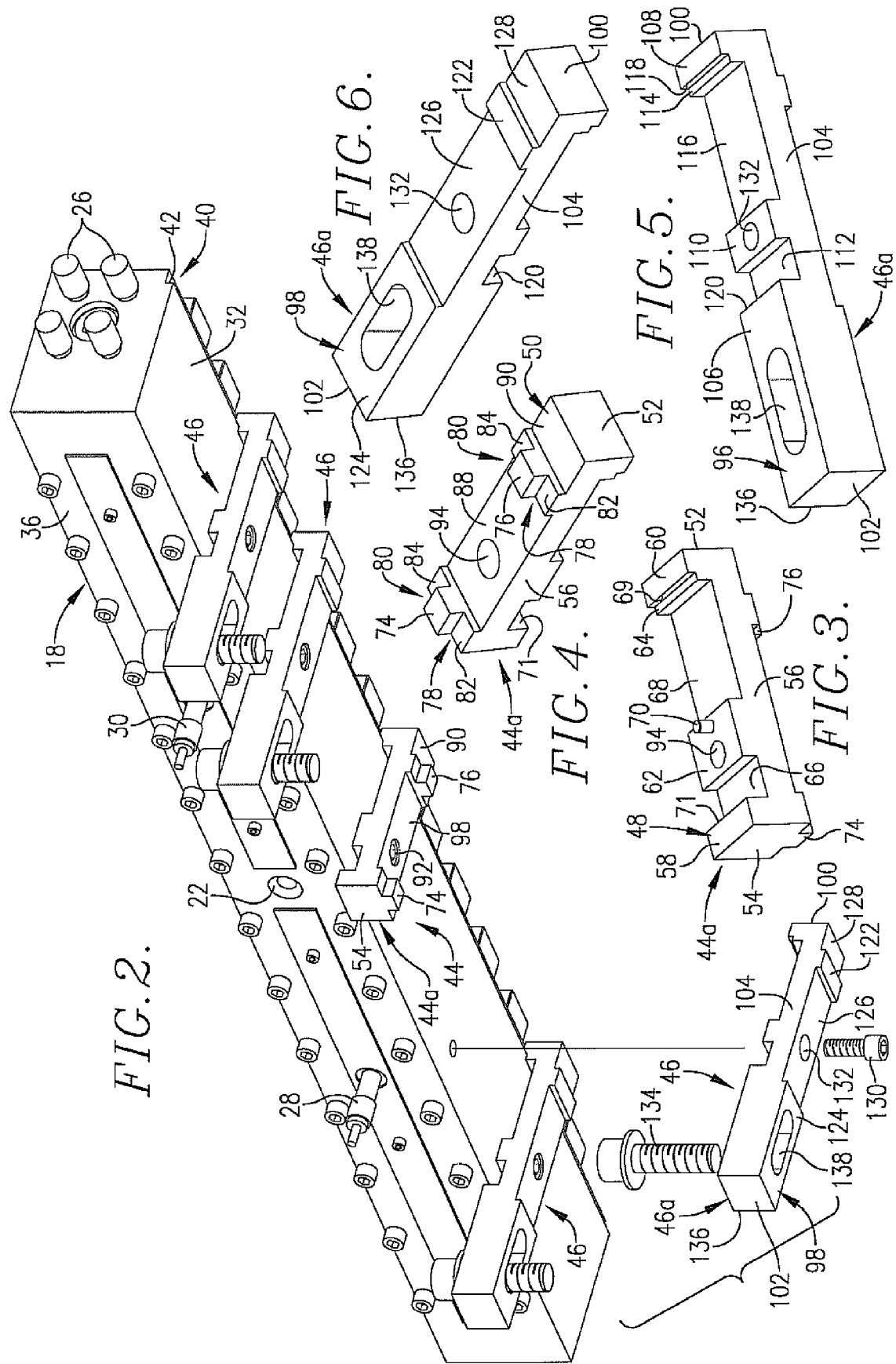

UNIVERSAL MOUNTING BRACKETS FOR ATTACHING A HOT INJECTION MANIFOLD TO THE LOWER DIE SET OF AN INJECTION BLOW MOLDING MACHINE

RELATED APPLICATION

This application is related to and claims the priority benefit of prior U.S. Provisional Application No. 60/782,187 filed Mar. 14, 2006, said Provisional Application being hereby incorporated by reference into the present specification

TECHNICAL FIELD

The present invention relates to the field of injection blow mold tooling and, in particular, to the way in which a hot runner manifold block is secured to the lower die set at the injection station of an injection blow mold machine.

BACKGROUND AND SUMMARY

Hot runner manifold blocks are used to deliver molten plastic material from the injection unit to multiple parison cavities at the injection station. The manifold block typically comes in a variety of designs and styles, but an important goal of each style is to achieve balanced flow of the molten material evenly to all of the parison cavities. Achieving balanced flow is critical to the stability of the bottle-making process and the uniform dimensional and distribution attributes of the bottles produced on the machine.

It is known in the art to attach the manifold block to a large base plate which is then bolted to the lower die set. However, as the base plate directly contacts the hot manifold block and the lower die set, the base plate acts as a heat sink or area of loss through its contact areas with the manifold block. Such heat loss is a direct drain of manifold block heat in the contacted areas and can adversely affect the distribution of molten material to the parison cavities even in the best of manifold block designs.

In accordance with current practice, manifold blocks and their base plates come in many different sizes. While each manifold block and base plate can be designed such that their points of mutual contact optimize thermal characteristics within the space available at the injection station, this is an expensive, time-consuming undertaking. Moreover, material cost is a consideration due to the relatively large size of current base plates.

The intent of the present invention is to eliminate the base plate and replace it with a set of relatively small mounting brackets made of a low thermally conductive material to minimize heat loss from the manifold block. The design, shape and dimensions of the brackets can be standardized to serve manifold blocks of a standard width but various lengths in accordance with variations in the number of parison cavities involved.

BRIEF DESCRIPTION OF THE DRAWINGS

FIG. 2 is a bottom isometric view of the manifold block with a set of mounting brackets in accordance with the principles of the present invention attached thereto;

FIG. 3 is a top isometric view of a central guide bracket of the set of brackets used with the manifold block in FIG. 2;

FIG. 4 is a bottom isometric view of the guide bracket;

FIG. 5 is a top isometric view of one of the outboard hold-down brackets of the set associated with the manifold block of FIG. 2;

FIG. 6 is a bottom isometric view of the hold-down bracket of FIG. 5;

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
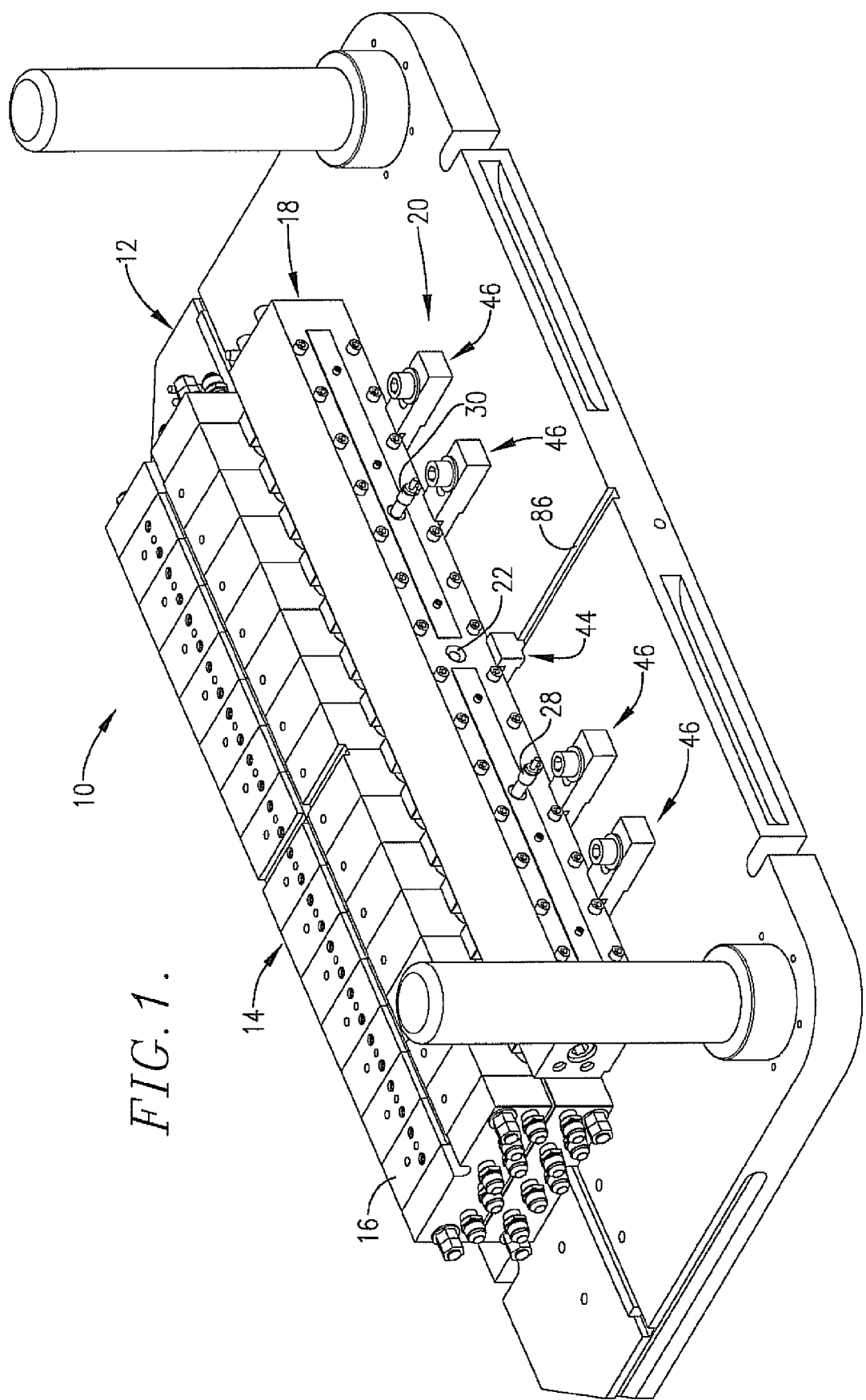
FIG. 1 is a top isometric view of an injection station of an injection blow mold machine with the upper die set removed and with tooling in accordance with the present invention secured to the lower die set of the station.

FIG. 1 illustrates in part the injection station 10 of an injection blow molding machine. The upper machine die set is removed in FIG. 1 for clarity, leaving the lower machine die set 12. A series of molds 14, each comprising an upper mold half 16 and a lower mold half (obstructed from view in the drawings) comprise part of the tooling at injection station 10 for use in producing parisons that will be blown into bottles. Upper mold halves 16 are secured to the upper machine die set for movement therewith as the molds open and close, while the lower mold halves are secured to lower die set 12. A manifold block 18 comprises another part of the tooling at station 10 and performs the role of receiving hot, molten plastic material from a source (not shown) and distributing that material into all parison cavities of the molds 14 evenly and simultaneously. Manifold block 18 is attached to lower die set 12 by a set 20 of special bracket assemblies hereinafter described in more detail.

Manifold block 18 comprises an elongated, rectangular body having a centrally disposed inlet 22 in its backside for receiving hot, molten plastic material under pressure from the source coupled in flow communication with inlet 22. From the single inlet 22, a number of internal passageways or "hot runners" receive the molten material and distribute it to outlets or nozzles 24 on the front side of manifold block 18 corresponding in number to the molds 14. Nozzles 24 then inject the molten plastic into the parison cavities presented by molds 14 during each injection cycle. In order to keep the internal passageways properly heated, manifold block 18 is provided with a number of internal heating elements 26 (FIGS. 7 and 8) that are controlled by a pair of thermocouples 28 and 30 projecting rearwardly from the rear side of manifold block 18. In a preferred embodiment, manifold block 18 has a flat bottom face 32, a flat front face 34, a flat rear face 36, and a flat top face 38. A full length notch 40 extends along the front margin of bottom face 32 at its intersection with front face 34 so as to present a relatively short, upright, forwardly facing shoulder 42.

The set of bracket assemblies 20 preferably includes two different types, namely a centrally disposed guide bracket assembly 44 and at least a pair, and preferably two pairs, of outboard hold-down bracket assemblies 46 on opposite sides of central guide bracket assembly 44. With particular reference to FIGS. 3 and 4, guide bracket assembly 44 comprises an elongated, rectangular guide bracket 44a having a length that is slightly greater than the width of manifold block 18 and a width that is many times less than the length of manifold block 18. Bracket 44a is preferably constructed from a low thermal conductive material such as 303 stainless steel. Guide bracket 44a includes a top side broadly denoted by the numeral 48, a bottom side broadly denoted by the numeral 50, a front end broadly denoted by the numeral 52, and a rear end broadly denoted by the numeral 54. In addition, guide bracket 44a has a pair of opposite, lateral sides 56.

Figure 7:
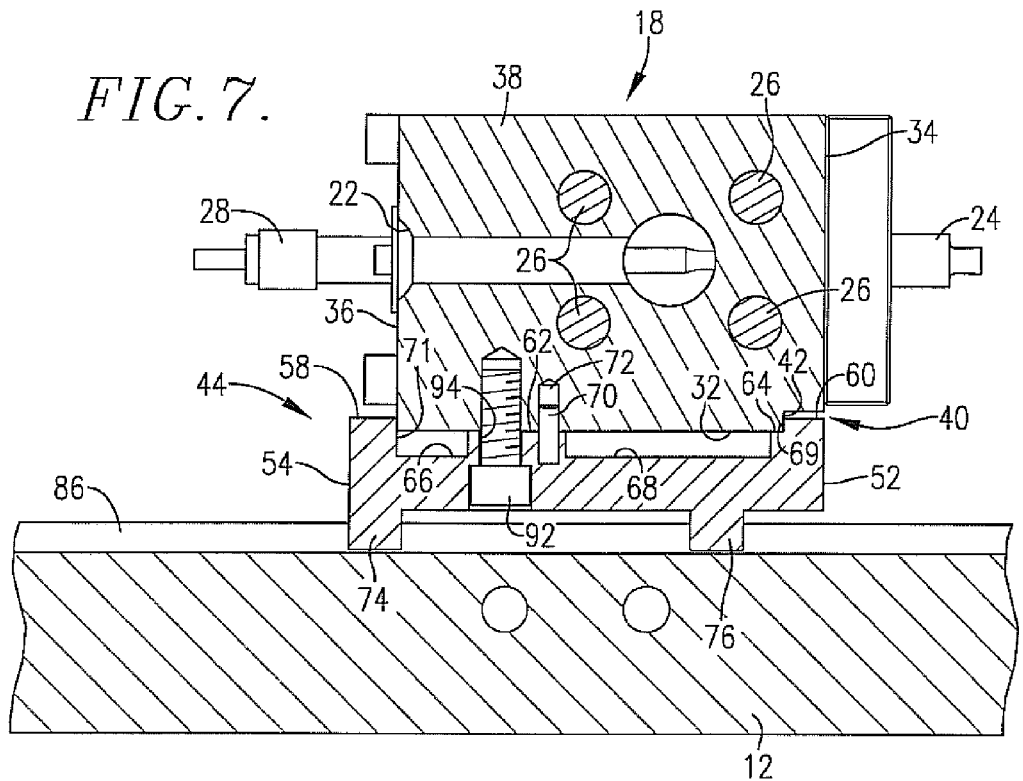
FIG. 7 is a fragmentary, vertical, transverse cross-sectional view through the tooling of FIG. 1 taken in the center of the tooling to illustrate the relationship between the central guide bracket, the manifold block and the lower die set.

Top side 48 of guide bracket 44a has a pair of uppermost end surfaces 58 and 60 that do not contact the bottom of manifold block 18 when guide bracket 44a is attached thereto as hereinafter explained in more detail. At a slightly lower level than uppermost end surfaces 58 and 60 are a pair of manifold-contacting or load-supporting surfaces 62 and 64, the surface 62 being in the nature of a rectangular pad while the surface 64 is in the nature of a shelf 64. Both pad 62 and shelf 64 are located at the same height. Shelf 64 is located immediately adjacent uppermost end surface 60, while pad 62 is located intermediate opposite ends 52, 54 but closer to rear end 54 than front end 52. A pair of recessed top surfaces 66 and 68 are disposed on opposite sides of pad 62, the recessed surface 66 being located between pad 62 and rear end 54 while the recessed surface 68 is located between pad 62 and shelf 64. A pair of opposed, upright, inwardly facing abutments 69 and 71 are disposed adjacent shelf 64 and recessed surface 66, respectively. The distance between abutments 69 and 71 matches the transverse dimension of the manifold block 18 along bottom face 32 between front face 36 and upright shoulder 42 of notch 40. Thus, when guide bracket 44a is installed up against the bottom of manifold block 18, manifold block 18 nests within and is confined in a transverse sense by the abutments 69 and 71. An upstanding locating dowel pin 70 rises from pad 62 for reception within a mating bore 72 in the bottom face 32 of manifold block 18 (FIG. 7).

The bottom side 50 of guide bracket 44a is provided with a pair of rectangular projections or keys 74 and 76 that are spaced apart longitudinally of the bracket. Keys 74, 76 are located on the axial center line of guide bracket 44a so as to be in axial alignment with one another, and each key 74, 76 is narrower than the full width of bracket 44a so as to define a pair of notches 78 and 80 on opposite lateral sides of each key 74, 76. Notches 78, 80 thus present a pair of load-bearing pads 82 and 84 that face downwardly.

As will be seen, keys 74, 76 are sized to be received within a transversely extending guide slot 86 in lower die set 12 for the purpose of maintaining proper alignment of manifold block 18 on lower die set 12. Each of the keys 74, 76 is slightly shorter than the depth of guide slot 86 such that keys 74, 76 do not contact the bottom of guide slot 86. Instead, pads 82, 84 engage and bear against the surface of lower die set 12 when keys 74, 76 are received within guide slot 86.

Key 74 is located at the rear end 54 of guide bracket 44a, while key 76 is located generally adjacent front end 52 thereof, although spaced somewhat rearwardly therefrom. A large recessed bottom surface 88 stretches between keys 74 and 76, and is recessed even further than pads 82, 84 from the lower extremities of keys 74, 76. Likewise, a recessed bottom surface 90, at the same level as recessed surface 88, extends from key 76 to the front end 52 of guide bracket 44a. Both recessed surfaces 88 and 90 are so disposed as to be out of thermal contact with lower die set 12 when guide bracket 44a has its keys 74, 76 received within guide slot 86.

Guide bracket assembly 44 also includes a fastener in the nature of a bolt 92. Bolt 92 passes through a hole 94 in bracket 44a, which extends through pad 62. Bolt 92 is used to secure guide bracket 44a to the bottom of manifold block 18.

As illustrated in FIGS. 5 and 6, each hold-down bracket assembly 46 includes an elongated hold-down bracket 46a having a length that is substantially greater than the width of manifold block 18 and a width that is many times less than the length of manifold block 18. Hold-down bracket 46a comprises a relatively slender, rectangular block preferably constructed of a low thermal conductive material such as 303 stainless steel. The hold-down bracket 46a thus includes a top side generally denoted by the numeral 96, a bottom side denoted generally by the numeral 98, a front end generally denoted by the numeral 100, and a rear end generally denoted by the numeral 102. In addition, hold-down bracket 46a includes a pair of opposite lateral sides 104.

In many respects the top side 96 of hold-down bracket 46a is similar to the top side 48 of guide bracket 44a. Thus, top side 96 of hold-down bracket 46a includes an uppermost flat end surface 106 at the rear end 102 and an uppermost end surface 108 at front end 100. An upper load-supporting surface is defined by a pad 110 that is recessed somewhat relative to uppermost surfaces 106 and 108. Pad 110 is spaced forwardly from uppermost surface 106 so as to present an upper recessed surface 112 that is recessed even more deeply than pad 110. A second uppermost load-bearing surface is presented by a shelf 114 at the same level as pad 10 and located closely adjacent rear uppermost surface 108. Between pad 110 and shelf 114 is defined another upper recessed surface 116 that is at the same level as the first upper recessed surface 112. A pair of opposed, inwardly facing abutments 118 and 120 are defined at the front end of the space between pad 110 and front surface 108 and between the pad 110 and rear surface 106. The distance between abutments 118, 120 matches the transverse dimension of the manifold block 18 along bottom face 32 between front face 36 and upright shoulder 42 of notch 40. Thus, when hold-down bracket 46a is installed up against the bottom of manifold block 18, manifold block 18 nests within and is confined in a transverse sense by the abutments 118, 120.

Bottom side 98 of hold-down bracket 46a does not have projections such as keys 74, 76 on guide bracket 44a. Instead, bottom side 98 has a pair of lowermost load-bearing surfaces that are spaced apart longitudinally and take the form of a transversely extending pad 122 adjacent front end 100, and a large pad 124 adjacent rear end 102. Stretching between pads 122 and 124 is a lengthy recessed bottom surface 126. A second recessed bottom surface 128 of shorter length is presented between pad 122 and front end 100. Both recessed bottom surfaces 126 and 128 are at the same level.

Each hold-down bracket assembly 46 additionally includes a fastener in the form of a bolt 130 (FIG. 8) that secures the bracket 46a to the bottom of manifold block 18. Bolt 130 passes through a hole 132 in the body of bracket 46a that extends through pad 110 on top side 96.

In addition, each hold-down bracket assembly 46 includes a fastener in the form of a hold-down bolt 134 for securing the bracket 46a to lower die set 12. In this respect, each hold-down bracket 46a has an extension 136 at its rear end 102 that makes hold-down bracket 46a considerably longer than guide bracket 44a and provides the means by which bracket 46a can be secured to lower die set 12. Bolt 134 passes through a longitudinally elongated slot 138 in extension 13 6 that is longer than the diameter of bolt 134 but narrower than the diameter of a washer 140 under the head of bolt 134. Thus, bolt 134 may securely attach hold-down bracket 46a to die plate 12; yet, when bolt 34 is loosened, hold-down bracket 46a may be shifted, along with manifold block 18 to which it is attached, toward and away from molds 14 in a direction parallel to the guide slot 86.

OPERATION

The manner of using the set 20 of guide brackets 44, 46 should be apparent from the foregoing description. Consequently, such use will only be briefly described at this point.

The guide bracket assembly 46 is attached to the bottom of manifold block 18 as shown in FIGS. 2 and 7. Preferably, it is located at the longitudinal mid-point of manifold block 18. When bracket 44a of bracket assembly 44 is applied to the bottom face 32 of manifold block 18, bottom face 32 is received by and becomes nested between the opposing abutments 69 and 71. Upright shoulder 42 of notch 40 bears against front abutment 69, while upright rear face 36 bears against rear abutment 71. In addition, dowel pin 70 slips into bore 72. The bottom face 32 of manifold block 18 contacts pad 62 and shelf 64, but there is no other contact between bottom face 32 of manifold block 18 and guide bracket 44a. Bolt 92 draws bracket 44a tightly up against bottom face 32.

Similarly, hold-down bracket assemblies 46 are attached to the bottom of manifold block 18 in outboard locations relative to the centrally disposed guide bracket assembly 44. It is preferred that a pair of the hold-down bracket assemblies 46 be utilized on each side of central guide bracket assembly 44, but the actual number is subject to personal preference as more or fewer of such hold-down bracket assemblies could be utilized. In each instance, however, the hold-down bracket assemblies 46 are attached to manifold block 18 in the manner illustrated in FIGS. 2 and 8.

When a hold-down bracket 46a is applied to the bottom of manifold block 18, bottom face 32 of manifold block 18 becomes nested between and confined by opposing abutments 118 and 120. This prevents relative shifting between manifold block 18 and hold-down bracket 46 in a direction transverse to the longitudinal axis of manifold block 18. Bottom face 32 of manifold block 18 bears against shelf 114 and pad 110 at this time, while recessed surfaces 112 and 116 are spaced out of thermal contact with manifold block 18. Bolt 130 draws manifold block tightly against shelf 114 and pad 110.

Figure 8:
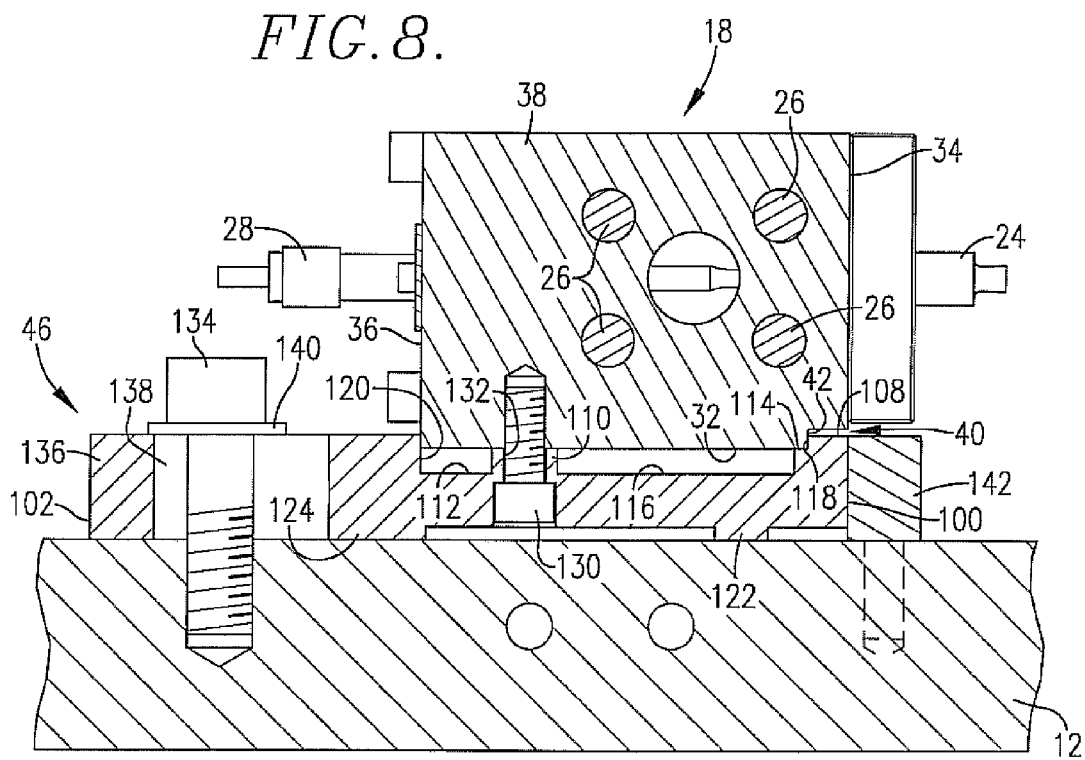
FIG. 8 is a fragmentary, vertical, cross-sectional view through the tooling of FIG. 1 similar to FIG. 7 but taken at an outboard location to illustrate the relationship between a hold-down bracket, the hot manifold block and the lower die set.

When all of the brackets of set 20 are securely attached to manifold block 18, the manifold/bracket assembly is placed on lower die set 12 with keys 74,76 of central guide bracket 44 received within guide slot 86. This centers manifold block 18 and assures that nozzles 24 are properly aligned with the gates of the mold cavities molds 14. The manifold/bracket assembly can thus be moved forwardly toward molds 14 until the front ends 100 of hold-down brackets 46 engage a stop bar 142 that extends the full length of manifold block 18 and is secured to lower die set 12 as shown in FIG. 8. This determines the proper operating position for the manifold/bracket assembly, whereupon hold-down bolts 134 may be screwed down into awaiting threaded holes within lower die set 12. To the extent manifold block 18 thereafter needs to be moved back away from molds 18 for any reason, it is only necessary to loosen hold-down bolts 134 within slots 138, whereupon the manifold/bracket assembly can be moved rearwardly to the extent permitted by slots 138.

It is to be appreciated that due to the small size of brackets 44a, 46a and the fact that they are few in number, much less of the bottom of manifold block 18 is contacted by mounting structure than in conventional arrangements wherein a large mounting plate having dimensions that often exceed the silhouette of the manifold block is utilized. Moreover, with respect to each individual bracket 44a or 46a, it will be noted that the points of thermal contact between the brackets and the manifold block 18 are minimized without sacrificing stability and structural integrity. The surface area represented by recessed surfaces 66, 68 on guide bracket 44a and recessed surfaces 112, 116 on hold-down brackets 46a is significantly larger than the areas of contact represented by the pads 62, 110 and shelves 65, 114. Furthermore, as illustrated in FIGS. 7 and 8, the points of thermal contact between brackets 44a, 46a and the bottom face 32 of manifold block 18 are offset laterally to some extent with respect to the closest heating elements 26 within manifold block 18. Thus, the resulting increased distance to the contact points helps give more uniform heat distribution.

Moreover, on the bottom sides of the brackets 44, 46, the contact points between such brackets and lower die set 12 are minimized as much as possible and strategically located. This further contributes to more uniform heat distribution for the hot melt passageways inside manifold block 18.

It is contemplated that a significant number of bracket assemblies 44 and 46 can be prepared in an advance and kept in stock without the need for designing special brackets for each new manifold block. The best locations for the brackets can be determined through proper analysis, and then such locations can be utilized in connection with a number of different manifolds of different lengths but identical widths. This saves considerable time and expense compared to the conventional practice of designing and machining a new base plate for each manifold block that may be produced for use in a particular injection molding machine. Moreover, bracket assemblies 44,46 in accordance with the present invention are quickly and easily installed on a manifold block and on the lower die set.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Tooling for use at the injection station of an injection blow molding machine, said tooling comprising:
   an elongated manifold block having an inlet for receiving hot molten plastic material from a source thereof and a plurality of outlets for distributing the material to a plurality of mold cavities at the injection station; and
   a plurality of transversely extending brackets spaced along the length of the manifold block and attached thereto,
   at least certain of the brackets being adapted to be detachably secured to a lower die set at the injection station for removably attaching the manifold block to the lower die set,
   each of said brackets having a top side provided with a pair of load-supporting surfaces engaging the bottom of the manifold block at a pair of transversely spaced locations across the width of the manifold block,
   said top side further being provided with recessed top surfaces adjacent said load-supporting surfaces,
   said recessed top surfaces being out of thermal contact with the bottom of the manifold block.

2. Tooling as claimed in claim 1,
   said top side further being provided with a pair of opposed, inwardly facing, transversely spaced apart abutments engaging opposite front and rear faces of the manifold block to confine the manifold block in a direction transverse to its longitudinal axis.

3. Tooling as claimed in claim 2,
said load-supporting surfaces including a pad located between said abutments,
there being a first recessed top surface between the pad and a first of said abutments and a second recessed top surface between the pad and the second of said abutments.

4. Tooling as claimed in claim 3,
said load-supporting surfaces further including a shelf adjacent said second abutment and spaced from said pad.

5. Tooling as claimed in claim 3,
said pad having a fastener passing therethrough and securing the bracket to the manifold block.

6. Tooling as claimed in claim 1,
each of said brackets further having a bottom side provided with a pair of lower load-bearing surfaces disposed to contact the lower die set at a pair of transversely spaced locations across the width of the manifold block,
said bottom side further being provided with recessed bottom surfaces adjacent the lower load-bearing surfaces disposed to be out of thermal contact with the lower die set when the manifold block is attached to the lower die set.

7. Tooling for use at the injection station of an injection blow molding machine, said tooling comprising:
an elongated manifold block having an inlet for receiving hot molten plastic material from a source thereof and a plurality of outlets for distributing the material to a plurality of mold cavities at the injection station; and
a plurality of transversely extending brackets spaced along the length of the manifold block and attached thereto,
at least certain of the brackets being adapted to be detachably secured to a lower die set at the injection station for removably attaching the manifold block to the lower die set,
each of said brackets having a bottom side provided with a pair of lower load-bearing surfaces disposed to contact the lower die set at a pair of transversely spaced locations across the width of the manifold block,
said bottom side further being provided with recessed bottom surfaces adjacent the lower load-bearing surfaces disposed to be out of thermal contact with the lower die set when the manifold block is attached to the lower die set.

8. Tooling as claimed in claim 7,
said plurality of brackets including a guide bracket having at least a pair of aligned projections adapted to be received within a guide slot in the lower die set,
said lower load-bearing surfaces being located adjacent said projections in recessed relationship therewith.

9. Tooling as claimed in claim 6,
said certain brackets each having an extension projecting rearwardly from the manifold block,
further comprising a fastener passing through the extension for releasably securing the bracket to the lower die set.

10. Tooling as claimed in claim 9,
said extension having a slot that is elongated in a transverse direction relative to the longitudinal axis of the manifold block,
said fastener being disposed within said slot to permit adjustment of the manifold block in a transverse direction when the fastener is loosened.

11. Tooling for use at the injection station of an injection blow molding machine, said tooling comprising:
an elongated manifold block having an inlet for receiving hot molten plastic material from a source thereof and a plurality of outlets for distributing the material to a plurality of mold cavities at the injection station; and
a plurality of transversely extending brackets spaced along the length of the manifold block and attached thereto,
at least certain of the brackets being adapted to be detachably secured to a lower die set at the injection station for removably attaching the manifold block to the lower die set,
said plurality of brackets including a central guide bracket and at least a pair of outboard hold-down brackets spaced longitudinally along the manifold block from said central guide bracket on opposite sides thereof,
said central guide bracket being devoid of fasteners for securing the central guide bracket to the lower die set,
said outboard hold-down brackets each having a fastener for securing the same to the lower die set.

12. Tooling as claimed in claim 11,
each of said brackets having a width that is several times less than the length of the manifold block.

13. A guide bracket assembly for use in attaching a manifold block to the lower die set at the injection station of an injection blow mold machine, said guide bracket assembly comprising:
an elongated bracket having a top side, a bottom side, and a pair of opposite ends,
said top side being provided with a pair of load-supporting surfaces for engaging the bottom of the manifold block at a pair of transversely spaced locations across the width of the manifold block,
said top side further being provided with recessed top surfaces adjacent said load-supporting surfaces disposed to be out of thermal contact with the bottom of the manifold block when the guide bracket is attached thereto,
said bottom side being provided with a pair of longitudinally aligned projections adapted to be received within a guide slot in the lower die set; and
a fastener for securing the bracket to the bottom of the manifold block.

14. A guide bracket assembly as claimed in claim 13,
said top side further being provided with a pair of opposed, inwardly facing, transversely spaced apart abutments for engaging opposite front and rear faces of the manifold block to confine the manifold block in a direction transverse to its longitudinal axis.

15. A guide bracket assembly as claimed in claim 14,
said load-supporting surfaces including a pad located between said abutments,
there being a first recessed top surface between the pad and a first of said abutments and a second recessed top surface between the pad and the second of said abutments.

16. A guide bracket assembly as claimed in claim 15,
said load-supporting surfaces further including a shelf adjacent said second abutment and spaced from said pad.

17. A guide bracket assembly as claimed in claim 16,
said fastener passing through said pad.

18. A guide bracket assembly as claimed in claim 16,
said bottom side further being provided with recessed bottom surfaces adjacent the lower load-bearing surfaces disposed to be out of thermal contact with the lower die set when the guide bracket is engaged with the lower die set.

19. A hold-down bracket assembly for use in attaching a manifold block to the lower die set at the injection station of an injection blow mold machine, said hold-down bracket assembly comprising:

an elongated hold-down bracket having a top side, a bottom side, and a pair of opposite ends, said top side being provided with at least a pair of load-supporting surfaces for engaging the bottom of the manifold block at a pair of transversely spaced locations across the width of the manifold block, said top side further being provided with recessed top surfaces adjacent said load-supporting surfaces disposed to be out of thermal contact with the bottom of the manifold block when the hold-down bracket is attached thereto, said bottom side being provided with a pair of longitudinally spaced, loading-bearing surfaces adapted to engage the lower die set when the hold-down bracket is attached thereto;

a first fastener for securing the hold-down bracket to the bottom of the manifold block; and a second fastener for securing the hold-down bracket to the lower die set.

20. A hold-down bracket assembly as claimed in claim 19, said top side further being provided with a pair of opposed, inwardly facing, transversely spaced apart abutments for engaging opposite front and rear faces of the manifold block to confine the manifold block in a direction transverse to its longitudinal axis.

21. A hold-down bracket assembly as claimed in claim 20, said load-supporting surfaces including a pad located between said abutments, there being a first recessed top surface between the pad and a first of said abutments and a second recessed top surface between the pad and the second of said abutments.

22. A hold-down bracket assembly as claimed in claim 21, said load-supporting surfaces further including a shelf adjacent said second abutment and spaced from said pad.

23. A hold-down bracket assembly as claimed in claim 22, said first fastener passing through said pad.

24. A hold-down bracket assembly as claimed in claim 22, said bottom side further being provided with recessed bottom surfaces adjacent the lower load-bearing surfaces disposed to be out of thermal contact with the lower die set when the hold-down bracket is engaged with the lower die set.

25. A hold-down bracket assembly as claimed in claim 24, further comprising an extension on one end of the hold-down bracket, said second fastener passing through the extension.

26. A hold-down bracket assembly as claimed in claim 25, said extension having a slot that is elongated in a direction parallel to the longitudinal axis of the hold-down bracket, said second fastener being disposed within said slot.

27. A hold-down bracket assembly as claimed in claim 19, further comprising an extension on one end of the hold-down bracket, said second fastener passing through the extension.

28. A hold-down bracket assembly as claimed in claim 27, said extension having a slot that is elongated in a direction parallel to the longitudinal axis of the hold-down bracket, said second fastener being disposed within said slot.

* * * * *